Feb. 8, 1955   J. DEPTA, JR   2,701,361
HOT GRIP HOLDER
Filed Nov. 28, 1951   2 Sheets-Sheet 1
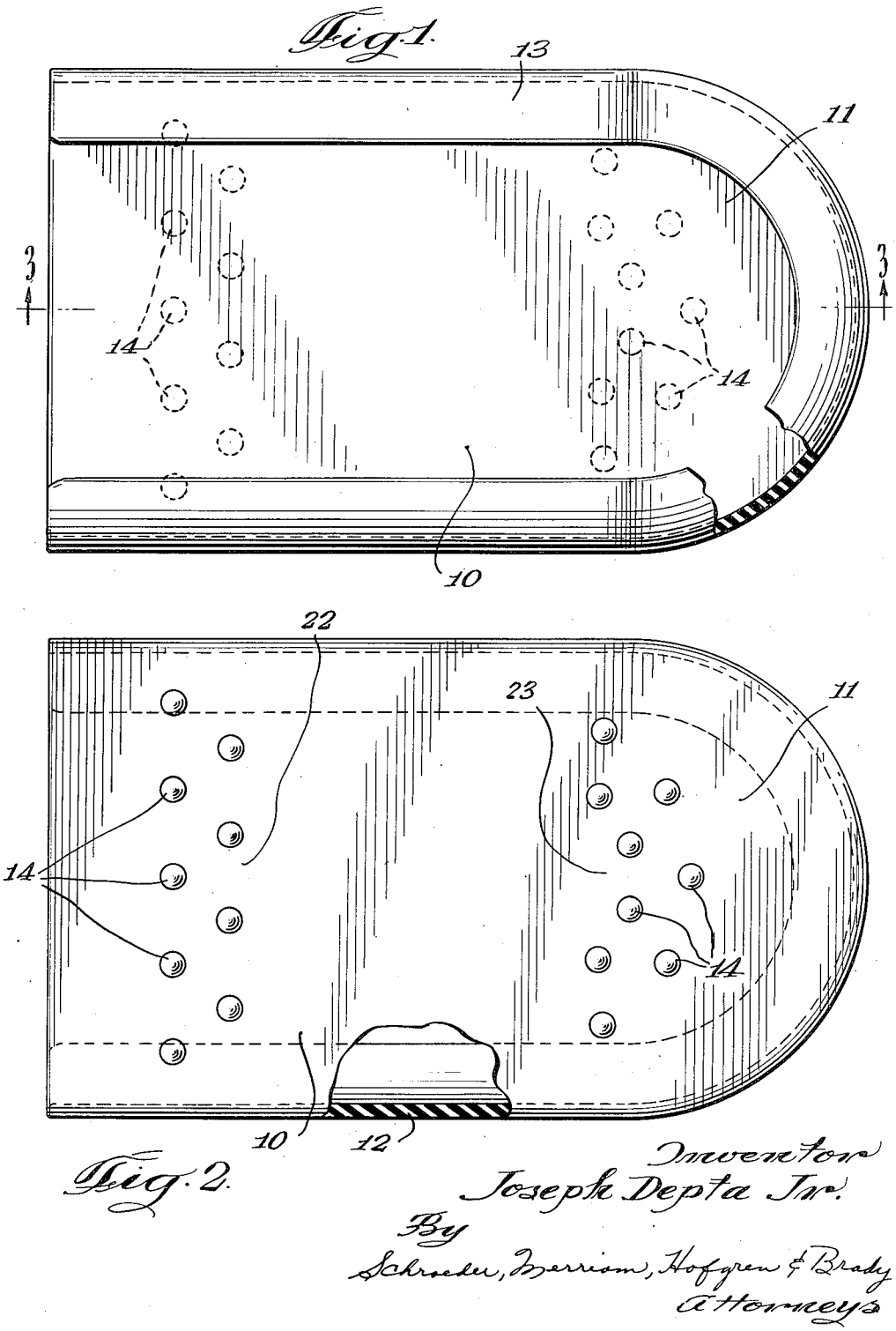

Feb. 8, 1955     J. DEPTA, JR     2,701,361
HOT GRIP HOLDER
Filed Nov. 28, 1951     2 Sheets-Sheet 2
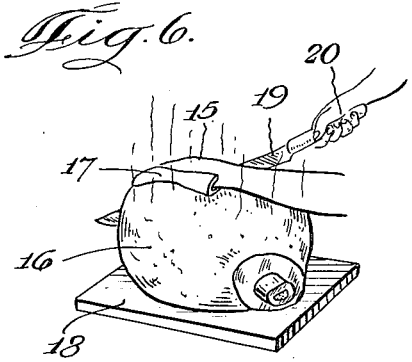
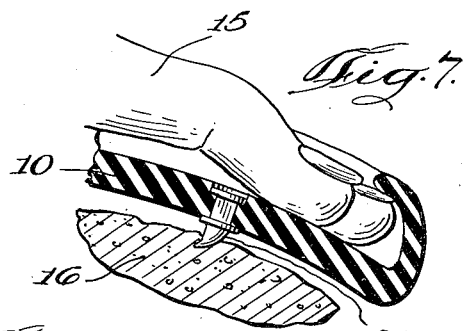
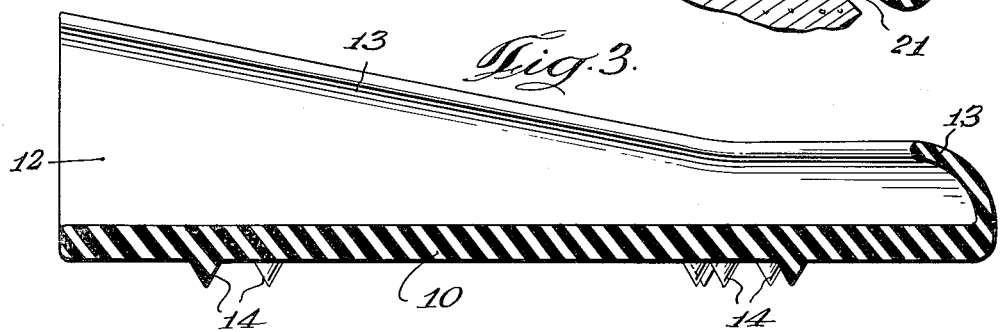
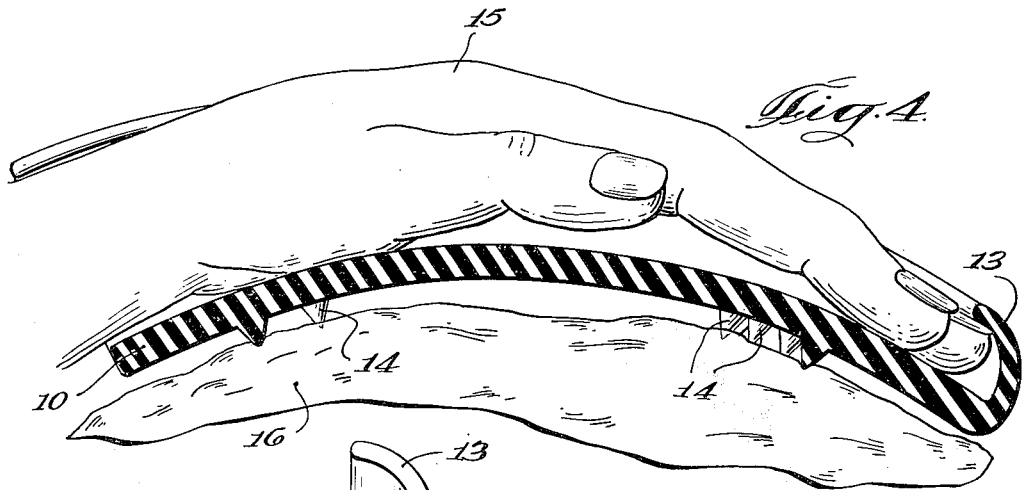
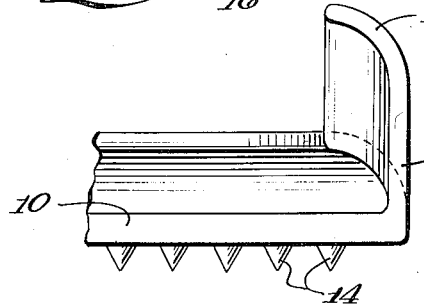

United States Patent Office 2,701,361
Patented Feb. 8, 1955

2,701,361

HOT GRIP HOLDER

Joseph Depta, Jr., Chicago, Ill.

Application November 28, 1951, Serial No. 258,713

4 Claims. (Cl. 2—20)

This invention relates to a holder for hot meat and more particularly to a holder adapted to fit on the hand and grip a piece of meat firmly while it is being carved.

There has long been a need for some means of holding a piece of hot meat such as a ham or a fowl while carving it. The carver will conventionally put the article to be carved on a carving board or platter and attempt to keep it in place with a fork held in one hand while he carves with a knife held in the other. There are many disadvantages to this method as anyone who has done much carving realizes. The meat is generally greasy and has a tendency to slip from the platter or board on which it is placed. This tendency is usually increased by the use of a long handled fork to hold the meat. With such a fork, the holding force is easily misapplied. It is also difficult to manipulate a piece of meat with a bone in it, for proper carving by means of such a long handled fork.

Applicant has devised and is here disclosing and claiming a hot grip holder one object of which is to provide a means for holding meat during carving which is certain, safe and sanitary. Another object is to provide such a holder which is insulated for use with hot meats. Further objects and advantages will appear from the following specification and from the drawings, in which:

Figure 1 is a plan view of the hot grip holder with a piece broken away; Figure 2 is a bottom view of the holder with a piece broken away; Figure 3 is a sectional view of Figure 1; Figure 4 is a sectional view of the hot grip holder showing it in place on the hand of the user and gripping a piece of meat; Figure 5 is a fragmentary end view; Figure 6 shows the hot grip holder in use; and Figure 7 shows a modification.

The hot grip holder is preferably composed of a flexible, flat sheet member 10 which is generally rectangular in shape with a semi-circular end portion 11 and is adapted to cover or engage the palm of the hand. An upwardly extending rim 12 is provided around a major portion of the periphery of the sheet member 10 and has an inwardly curved arcuate flange 13 which is adapted to grip the tips of the fingers and both sides of the edge of the hand so as to retain the holder in operative relationship to the hand. A plurality of conical pointed studs 14 are affixed to the bottom of the sheet member 10 and are adapted to penetrate and grip the material held with the holder.

Figure 4 shows a hand 15 with the holder (in section) about it as it would be used in gripping a piece of meat 16. Figure 6 is a diagrammatical view of a hot grip holder 17 being used to hold a piece of meat 16 in place on a slicing board 18 while it is carved or sliced by a knife 19 held by the hand 20.

The hot grip holder preferably is formed of a flexible, heat resistant, impervious or non-porous material such as synthetic rubber. The holder should be flexible so that it can easily be used with meats of varying sizes and shapes. The bottom portion 10 is sufficiently thick to act as an insulator in order that hot meats may be handled safely. This thickness will, of course, depend on the insulating properties of the material used but it is apparent that if the member 10 is too thick, it will not be sufficiently flexible. The material used is preferably impervious or non-porous for reasons of cleanliness. When in use the hot grip holder will become greasy, and if it is made of a non-porous material it will not be as difficult to clean as a more porous material like a fabric. It may be washed readily by merely holding it under a faucet and rinsing off the grease.

In the first embodiment of the hot grip holder shown conical studs 14 are integral with the member 10 and extend from the bottom thereof. This conical shape is preferable but is not intended to exclude the possibility of using other shapes such as polygonal pyramids. Another modification is shown in Figure 7 in which stainless steel stud inserts 21 are used instead of studs formed of the same material as the body of the holder.

It is preferable that the studs 14 be arranged on the bottom 10 of the holder in two groups 22 and 23 as is shown in Figures 1 and 2. This arrangement facilitates use of the holder with small pieces of meat since the hand and the holder may be bent and the studs engaged with the meat. This arrangement of the studs also permits use of the holder with extremely hot meat. Notwithstanding the insulating properties of the bottom member 10, with a very hot piece of meat the palm of the hand might very well be burned if substantially the entire surface of the holder were in contact with the meat. By arranging the studs 14 in the two groups 22 and 23 the meat may be gripped firmly while the center portion of the bottom 10 of the holder does not contact the meat as is shown in Figure 4. Thus only the portions of the holder in the vicinity of the tips of the fingers and the heel of the palm are exposed to the heat; and these are frequently spaced from the meat to some extent by the studs.

A holder such as this in which the hand is substantially in contact with the meat to be carved gives the carver very good control over the meat and simplifies the job of cutting from various directions as must be done when the meat has a bone in it, as for instance a leg of lamb or a fowl. Since applicant's holder is insulated for use with hot meats, and studded for a good grip, two of them may be utilized to lift the meat from the roaster to the platter or carving board. This is often a difficult job to perform with a fork and can be accomplished much more satisfactorily with applicant's holder.

The upwardly extending rim 12 and arcuate flange 13 serve a double purpose. First they cover and grip the tips of the fingers and both sides of the edge of the hand to retain the holder in place on the hand, with an arrangement which allows the user to don and remove the holder with a minimum of effort. A second advantage of the rim and the flange is that it protects the hand of the user in case the knife slips while carving.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A holder for holding hot meat of the character described, comprising: a flexible member adapted to engage the palm of the hand; means for holding said member on said hand, including an upwardly extending and inwardly directed peripheral portion extending around the front and sides thereof and adapted to engage and overlie the sides of the hand, the thumb and the tips of the fingers; and means on the bottom of said member for gripping a soft material.

2. A hot grip holder of the character described, comprising: a generally rectangular, flexible heat resistant member of impervious sheet material adapted to underlie the palm of the hand and having a generally semi-circular end portion adapted to underlie the tips of the fingers; means for holding said member on said hand, said means comprising a symmetrical upwardly and inwardly extending peripheral rim portion around the two longitudinal sides and the semicircular end portion of said member, adapted to engage and protect the sides of the hand, the thumb and the tips of the fingers of either hand; and means on the bottom of said member for gripping a soft material such as meat, said means comprising a plurality of pointed studs.

3. A hot grip holder of the character claimed in claim 2 wherein the plurality of pointed studs are formed integrally with said flexible member.

4. A hot grip holder of the character claimed in claim 2 wherein the plurality of pointed studs are formed of a stain resistant metal and rigidly attached to said flexible member.

References Cited in the file of this patent

UNITED STATES PATENTS

| | | |
|---|---|---|
| 690,302 | Lee | Dec. 31, 1901 |
| 1,371,602 | Butch | Mar. 15, 1921 |
| 2,001,961 | Jensen | May 21, 1935 |